(12) United States Patent
Tanaka et al.

(10) Patent No.: US 8,814,192 B2
(45) Date of Patent: Aug. 26, 2014

(54) DUMP TRUCK

(75) Inventors: Satoshi Tanaka, Hitachinaka (JP); Kosei Okamoto, Yokohama (JP); Yutaka Oikawa, Kawasaki (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 330 days.

(21) Appl. No.: 13/322,360

(22) PCT Filed: Jun. 16, 2010

(86) PCT No.: PCT/JP2010/060168
§ 371 (c)(1),
(2), (4) Date: Nov. 23, 2011

(87) PCT Pub. No.: WO2010/147131
PCT Pub. Date: Dec. 23, 2010

(65) Prior Publication Data
US 2012/0068432 A1    Mar. 22, 2012

(30) Foreign Application Priority Data

Jun. 17, 2009  (JP) .................................. 2009-144030

(51) Int. Cl.
*B60R 3/00*    (2006.01)
(52) U.S. Cl.
USPC .......................................................... 280/163
(58) Field of Classification Search
USPC ................................................ 280/163–169
See application file for complete search history.

(56) References Cited

U.S. PATENT DOCUMENTS

| 5,064,023 | A | 11/1991 | Loeber | |
|---|---|---|---|---|
| 6,209,682 | B1 * | 4/2001 | Duffy et al. | 182/127 |
| 7,775,169 | B2 * | 8/2010 | Horn et al. | 111/200 |

FOREIGN PATENT DOCUMENTS

| CN | 102029934 A | 4/2011 |
|---|---|---|
| JP | S63-247119 A | 10/1988 |
| JP | 2511244 Y2 | 7/1996 |
| JP | 11-502481 | 3/1999 |
| WO | 92/09781 A1 | 6/1992 |

OTHER PUBLICATIONS

"The Caterpillar F-series Off Highway Trucks" <www.youtube.com>.
Chinese Office Action issued Jun. 28, 2013 in Chinese Patent Application no. 2010800270585, including English translation, 9 pages.
International Search Report from International Application No. PCT/JP2010/060168, mailed Aug. 17, 2010, 2 pages.
Second Notification of Examiner's Opinion issued Nov. 5, 2013 in corresponding Chinese patent application No. 201080027058.5, including English translation, 11 pages.
http://www.heavyequipmentforums.com/showthread.php?3315-NEW-CAT-773F-Photos!, 2 pages.

\* cited by examiner

*Primary Examiner* — John Walters
*Assistant Examiner* — James Triggs
(74) *Attorney, Agent, or Firm* — Fish & Richardson P.C.

(57) ABSTRACT

A step arrangement of a dump truck includes a third step that leads down in an up-and-down direction of a vehicle body while being gradually directed forward, and a second step that is provided to a lower end of the third step and leads down in the up-and-down direction while being gradually directed from an outer side toward an inner side of the vehicle body. The height of an outer lower portion of the second step is higher than the height of an inner lower portion thereof.

18 Claims, 4 Drawing Sheets

DUMP TRUCK

CROSS-REFERENCE TO RELATED APPLICATIONS

This application claims priority to Application No. PC/JP2010/060168 filed Jun. 16, 2010, which application claims priority to Japanese Application No. 2009-144030, filed on Jun. 17, 2009. The contents of the above applications are incorporated herein by reference in their entireties.

TECHNICAL FIELD

The present invention relates to a dump truck. In particular, the present invention relates to a large-sized rigid dump truck usable for mine development or the like.

BACKGROUND ART

It has been known that a typical large-sized rigid dump truck includes a sub-platform provided by one of right and left ends of a front bumper of a vehicle body, a step-like flexible ladder being provided to the one end of the bumper to provide access from the ground to the sub-platform, and a fixed ladder that provides access from the sub-platform to a main platform located in front of a cab (Patent Literature 1).

CITATION LIST

Patent Literature

Patent Literature 1: U.S. Pat. No. 5,064,023

SUMMARY OF THE INVENTION

Problems to be Solved by the Invention

Recently, regarding the use of a step arrangement such as a ladder, ease of ascending and descending has been strictly regulated, which results in avoidance of using a steep step arrangement. However, in order to meet the regulation on the inclination angle of a step arrangement, a lower portion of the step arrangement has to considerably project forward from the vehicle body, which reduces the approach angle of the vehicle body (i.e., an angle between a ground-contact point of a front wheel and a front lower portion of the vehicle body) and increases a turning radius.

A step arrangement is generally located at a lateral side of a vehicle body. However, when the lateral side of the vehicle body is sunk because of rolling of the vehicle body, the lower portion of the step arrangement located at the lateral side is likely to bump against rocks on a road shoulder or the like to be damaged.

An object of the invention is to provide a dump truck in which the inclination of a step arrangement can be reduced to maintain favorable approach angle and turning radius and to prevent damage to the step arrangement.

Means for Solving the Problems

According to an aspect of the invention, a dump truck includes a step arrangement for ascending and descending provided to a front portion of a vehicle body thereof, the step arrangement including an upper step that leads down in an up-and-down direction of the vehicle body while being gradually directed forward, and a lower step that is provided to a lower end of the upper step and leads down in the up-and-down direction while being gradually directed from an outer side toward an inner side of the vehicle body, in which a height of an outer lower portion of the lower step is higher than a height of an inner lower portion thereof.

In the dump truck, the step arrangement includes a pair of step arrangements being respectively provided at right and left sides of the vehicle body with a distance therebetween.

In the dump truck, an outer corner of the lower step is provided with a step inclined portion that extends forward while being gradually directed inward when seen in plan view.

In the dump truck, a rear wheel provided to the vehicle body is double tires, and a boundary between a front surface of the lower step and the step inclined portion is located within a width of an inner one of the double tires.

In this aspect, the "double tires" mean a wheel provided by a pair of coaxially arranged tires.

In the dump truck, the front surface of the lower step and the step inclined portion are provided by a cover plate that extends outward while a level of a lower end thereof becomes gradually higher when seen in front elevational view.

In the dump truck, an inner end of the lower step is located outside relative to a center of the vehicle body in a right-and-left direction of the vehicle body.

In the dump truck, a lower end of the lower step is connected to a bumper of the vehicle body, and an upper portion of the bumper provides a path that has a front-and-rear width to be walkable in the right-and-left direction of the vehicle body.

In the dump truck, each of right and left sides of the bumper is provided with a bumper inclined portion that extends forward while being gradually directed inward when seen in plan view.

In the dump truck, the step arrangement includes a pair of step arrangements being respectively provided at right and left sides of the vehicle body with a distance therebetween, lower portions of the pair of step arrangements are connected to the bumper, upper portions of the pair of step arrangements are connected to access paths provided at upper right and left of the vehicle body, respectively, and a front grill through which a cooling air passes is provided to the vehicle body at a position between the pair of step arrangements.

According to the above aspect, the step arrangement includes the upper step and the lower step, the upper step leading downward in the up-and-down direction of the vehicle body while being gradually directed forward, the lower step leading downward in the up-and-down direction while being gradually directed from the outer side toward the inner side, so that a connecting portion between the upper step and the lower step forms a turnaround area. The length of the upper step, i.e., the length from the upper end of the upper step to the turnaround area, can be shortened, so that the inclination of the step arrangement can be reduced without increasing a current projecting amount of the step arrangement from the vehicle body. Additionally, since the lower step leads down from the outer side toward the inner side of the vehicle body, even when the inclination of the lower step is sufficiently reduced, the lower step is prevented from projecting forward from the vehicle body. Thus, even when each of the upper and lower steps has such a reduced inclination to be easier to ascend and descend, favorable approach angle and turning performance can be maintained. Further, since the height of the outer side of the lower step is higher than that of the inner side thereof, even when the vehicle body is sunk at a right or left side thereof due to rolling of the vehicle body, the lower step is unlikely to bump against obstacles such as rocks on a road shoulder.

Each of the bumper and the step arrangement is provided with a portion inclined when seen in plan view, so that an approach angle can be further increased. In particular, such a step inclined portion of the step arrangement serves to maintain a small turning radius, so that the vehicle body can be easily operated during turning.

The inner end of the lower step is located outside relative to the center of the vehicle body, so that even when a front grill functioning as an inlet for fresh air is provided to the front of the vehicle body in the vicinity of the center thereof, the front grill has a less area hidden behind the lower step located in front of the vehicle body. Thus, fresh air can be favorably introduced through the front grill.

The upper portion of the bumper is usable as the path walkable in the right-and-left direction. This path and the step arrangement in combination enable easy access from the ground to the upper side where a cab is located, thereby improving accessibility.

The vehicle body is provided with access paths at the upper right and left thereof. The access paths are connected to the bumper via the right and left steps, respectively. The front grill is provided between the right and left steps. With this arrangement, after maintenance on a hood located between the access paths, maintenance around the front grill can be continuously carried out without descending to the ground for maintenance, thereby improving operability.

DESCRIPTION OF EXEMPLARY EMBODIMENT

Exemplary embodiment of the invention will be described below with reference to the attached drawings.

Figure 1:
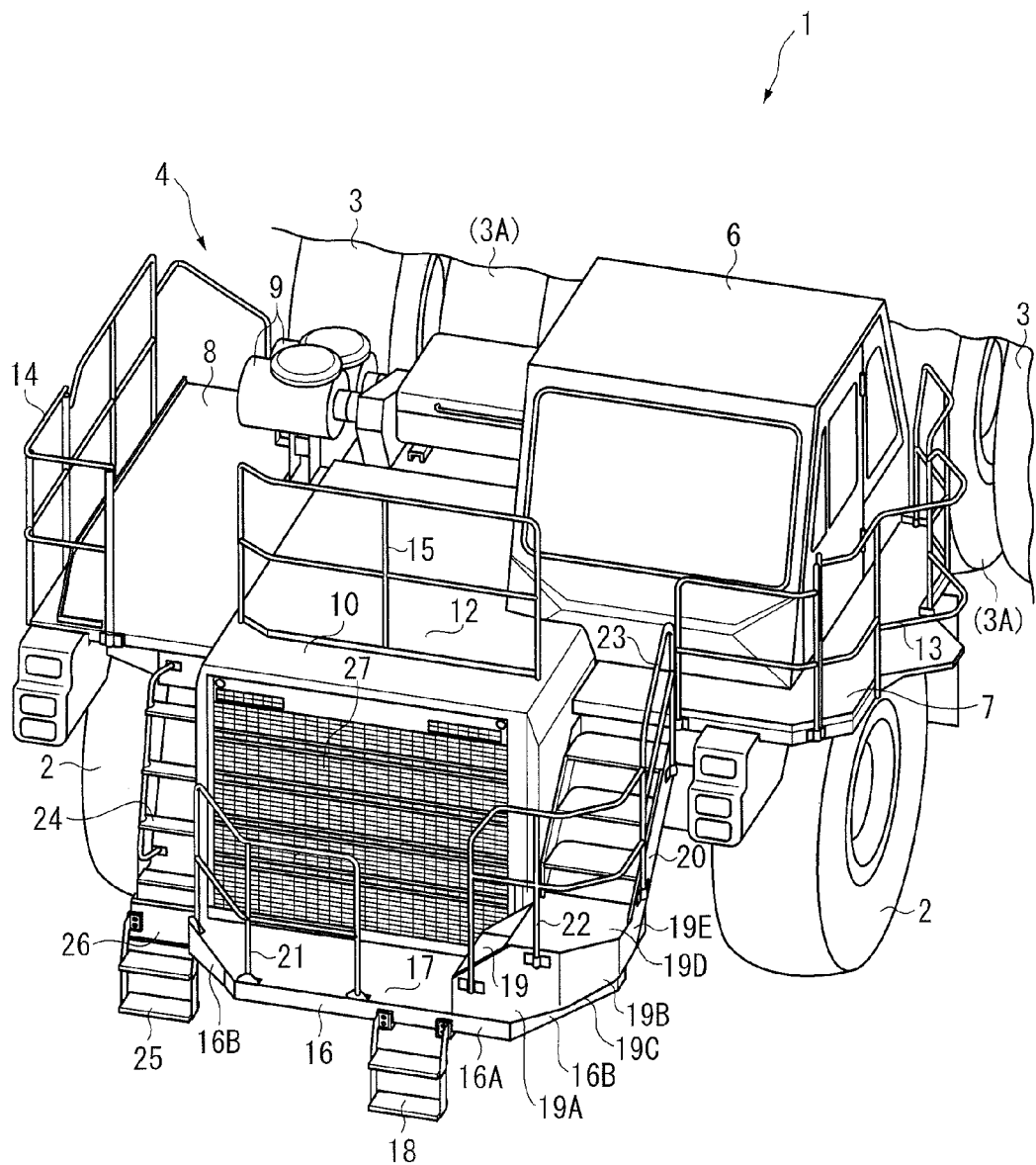
FIG. 1 is a perspective view of a dump truck according to an exemplary embodiment of the invention observed from the front side thereof.
Figure 2:
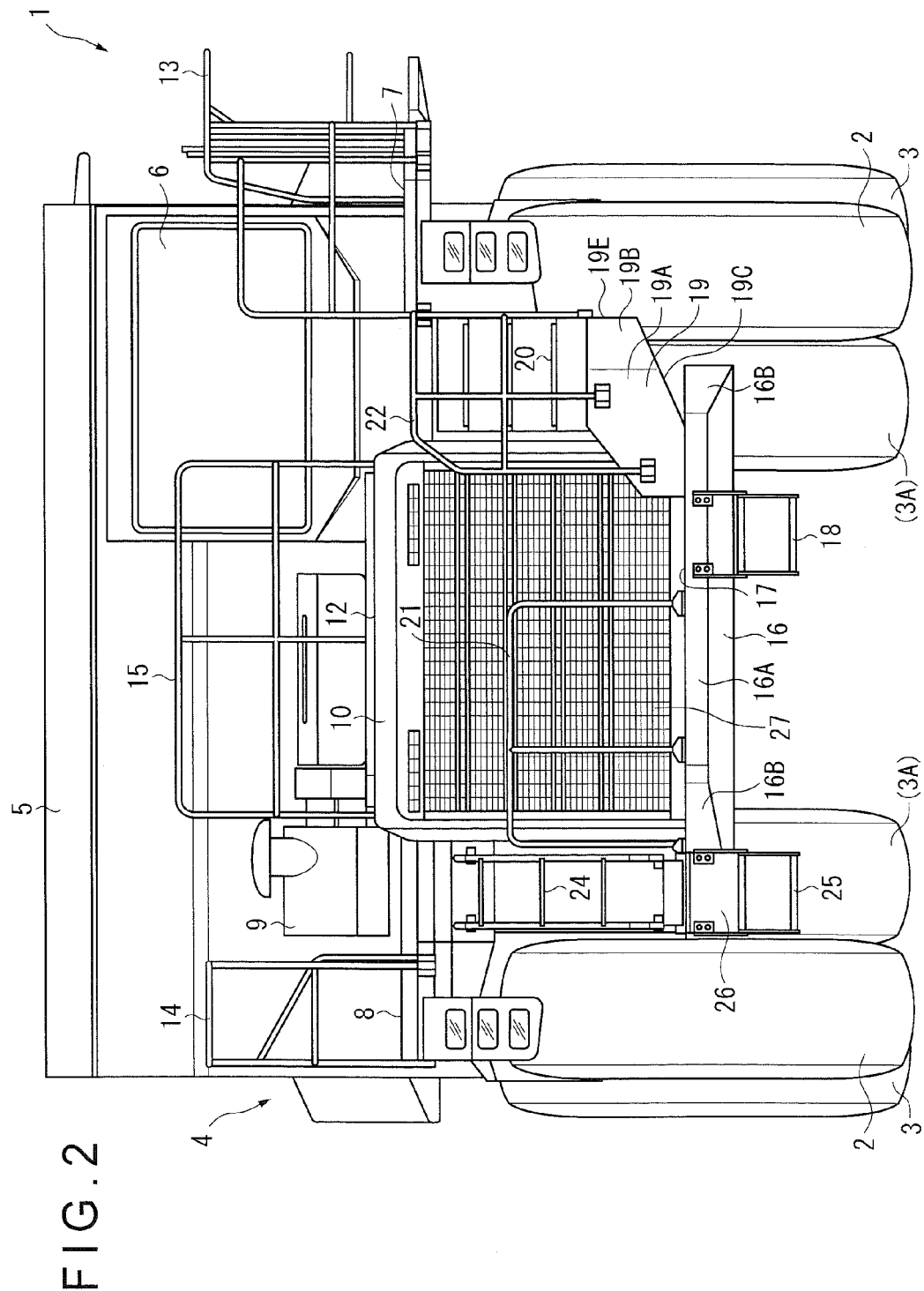
FIG. 2 is a front elevational view of the dump truck.
Figure 3:
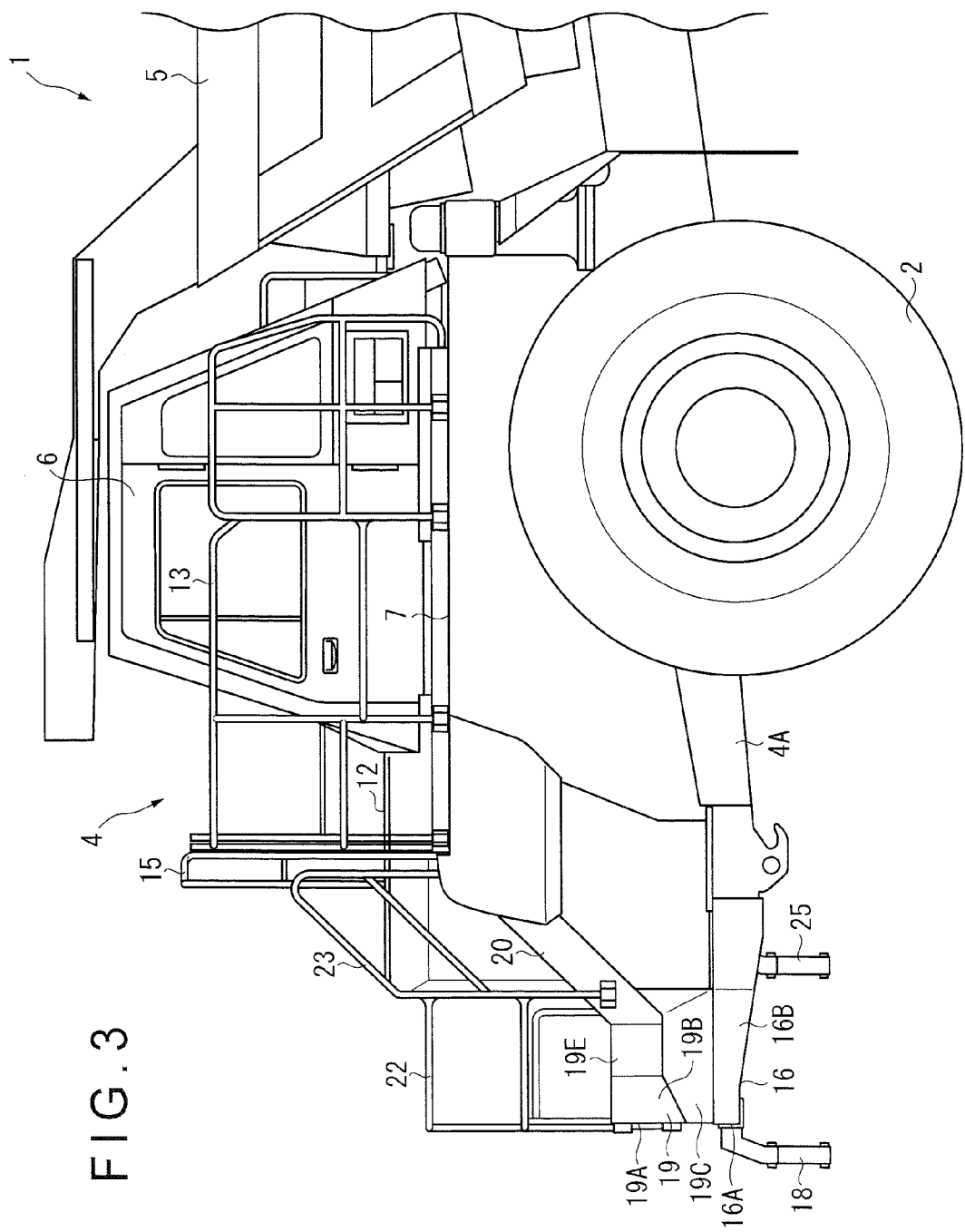
FIG. 3 is a left-side view of a front portion of the dump truck.
Figure 4:
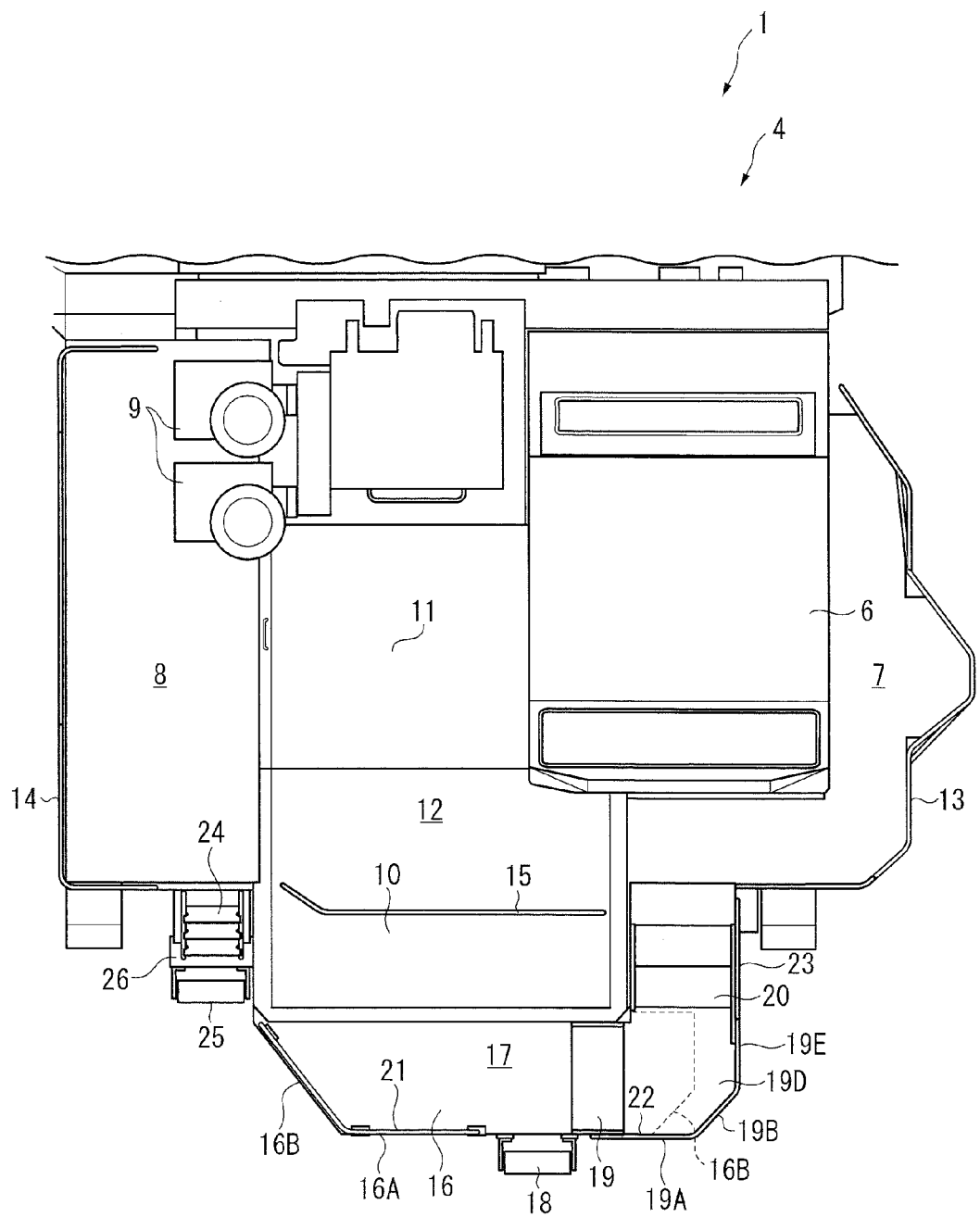
FIG. 4 is a plan view of the front portion of the dump truck.

FIG. 1 is a perspective view of a dump truck 1 according to the exemplary embodiment observed from the front side thereof. FIG. 2 is a front elevational view of the dump truck 1. FIG. 3 is a left-side view of a front portion of the dump truck 1. FIG. 4 is a plan view of the front portion of the dump truck 1. In the description hereinbelow, "front" means a forward side in a traveling direction of the dump truck 1, "rear" means the opposite side in the traveling direction, and "right" and "left" mean right and left defined when the dump truck 1 is oriented in the traveling direction.

The dump truck 1 a large-sized rigid dump truck usable for mine development or the like. The dump truck 1 includes a vehicle body 4 provided with right and left front wheels 2 (each of which is a single tire) and right and left rear wheels 3 (each of which is double tires), a body 5 being attached to the vehicle body 4 in an inclinable manner, and an operator cab 6 being provided to a front upper portion of the vehicle body 4 at a position shifted leftward. The body 5 is not shown in FIGS. 1 and 4 for reasons of illustration.

The vehicle body 4 includes a main frame 4A assembled in a frame shape in plan view (FIG. 3). The front wheels 3, rear wheels 3, body 5 and the like are attached to the main frame 4A. Driving units such as an engine and a hydraulic pump (both not shown) are mounted at the front center of the main frame 4A and below the cab 6. The cab 6 is located above the left front wheel 2. A left access path 7 is provided around the cab 6 to form an upper portion of a tire housing for the left front wheel 2, and enables access between the left side and the front side of the cab 6.

In the vehicle body 4, a right access path 8 is provided above the right front wheel 2 to form an upper portion of a tire housing for the right front wheel 2. The right access path 8 is used for carrying out maintenance of an air filter 9 for introducing air to be supplied to the engine and for opening a hatch 11 (FIG. 4) on a hood 10 to carry out maintenance of the engine and the like housed in the hood 10. According to the exemplary embodiment, an upper portion of the hood 10 provides a center access path 12 that communicates between the left access path 7 and the right access path 8. Handrails 13, 14 and 15 stand upright from the edges of the access paths 7, 8 and 12, respectively.

The hood 10 projects forward relative to the left access path 7 and the right access path 8. A front opening of the hood 10 is covered with a grid-like front grill 27, behind which a cooling fan is located so that a cooling air is introduced into the hood 10 from the outside to be supplied to a radiator (not shown). A lower portion of the hood 10 is provided with a bumper 16 that projects further forward.

A front-and-rear width of the bumper 16 is considerably larger than that of a typical bumper so that an operator can walk on the bumper 16 in the right-and-left direction. In other words, an upper portion of the bumper 16 provides a front access path (a path according to the invention) 17 walkable in the right-and-left direction in front of the hood 10. The length of the bumper 16 in the right-and-left direction is set within an interval between inner tires 3A of the rear wheels 3 as shown in FIG. 2. Specifically, the bumper 16 includes a front surface 16A and a first inclined portions (bumper inclined portions according to the invention) 16B. The first inclined portions 16B are formed continuously with both ends of the front surface 16A, respectively, and extend forward while being gradually directed inward (toward the center of the vehicle body 4) when seen in plan view (FIG. 4).

A first step 18 is provided to the front surface 16A of the bumper 16 near the left end thereof to provide access between the ground and the front access path 17. A second step (a lower step according to the invention) 19 is provided at an upper portion of the left end of the bumper 16. The second step 19 leads down in an up-and-down direction while being gradually directed from an outer side toward an inner side of the vehicle body 4.

The second step 19 includes a front surface 19A that faces forward and a second inclined portion 19B (a step inclined portion according to the invention) provided at the outer side of the front surface 19A. The second inclined portion 19B extends forward while being gradually directed inward when seen in plan view (FIG. 4). A lower side of the second step 19 is located outside relative to the center of the vehicle body 4 in the right-and-left direction and an upper side thereof projects further outward.

The second inclined portion 19B contributes to reduction in the turning radius of the dump truck 1. If the second step 19 had a square corner without the second inclined portion 19B, the turning radius would be increased to make an operation during turning difficult. In contrast, according to the exemplary embodiment, the second inclined portion 19B is provided at a position corresponding to such a corner and the center portion of the vehicle body 4 projects forward, so that it is not necessary to sacrifice a turning radius.

A boundary between the front surface 19A and the second inclined portion 19B is located within the width of the inner tire 3A of the rear wheel 3 when seen in front elevational view (FIG. 2). In this exemplary embodiment, the boundary is located near the outer side of the tire 3A.

A vertical cover plate 19E with bent portions is provided to a lateral side of the second step 19 to form the front surface 19A and the second inclined portion 19B. When seen in front elevational view, the cover plate 19E extends outward while the level of the lower end thereof from the ground becomes gradually higher. In other words, a third inclined portion 19C is provided to the lower side of the cover plate 19E over a range from the front surface 19A to the second inclined portion 19B, the third inclined portion 19C extending outward while the level thereof becomes gradually higher when seen in front elevational view (FIG. 2). The third inclined portion 19C is provided by a planar plate that covers a lower opening defined by the cover plate 19E.

With the third inclined portion 19C, the level of an outer lower portion of the second step 19 is higher than that of the upper portion of the bumper 16, i.e., an inner lower portion of the second step 19, so that even when the second step 19 projects outward on the left side thereof, the lower portion of the second step 19 and the like are unlikely to bump against rocks on a road shoulder during rolling of the dump truck 1 in the right-and-left direction or turning of the dump truck 1, resulting in less damage to the lower portion of the second step 19.

The second step 19 has a turnaround area 19D at the uppermost position thereof. After ascending from the front access path 17, an operator can turn toward the rear side at the turnaround area 19D. A third step (an upper step according to the invention) 20 is provided between the turnaround area 19D and the left access path 7 located thereabove. The third step 20 is located on the left side of the hood 10. The second step 19 and the third step 20 in combination provide a step arrangement according to the invention.

Without the second step 19, the third step 20 would be steepened to directly communicate between the left access path 7 and the front access path 17. According to the exemplary embodiment, the front access path 17 is provided with a few steps, i.e., the second step 19, on the end thereof, and the lower end of the third step 20 is coupled to the second step 19 to make the third step 20 less steep, so that an operator can easily ascend and descend the third step 20. Handrails 21, 22 and 23 likewise stand upright from appropriate portions of the front access path 17 and the second and third steps 19 and 20, respectively.

A fourth step 24 and a fifth step 25 are provided to the front side of the right access path 8 to provide access between the ground and the right access path 8. As shown in FIG. 2, a connecting portion 26 is provided between the fourth step 24 on the upper side and the fifth step 25 on the lower side at the same level as the bumper 16 so as to connect the fourth step 24 and the fifth step 25. In other words, the lower end of the fourth step 24 and the upper end of the fifth step 25 are connected to the connecting portion 26. The fourth step 24 is attached obliquely to the connecting portion 26. The fifth step 25 is attached to the connecting portion 26 to hang down toward the ground.

The dump truck 1 according to the exemplary embodiment provides the following advantages.

According to the exemplary embodiment, the third step 20 leads down from the left access path 7 while being gradually directed forward, and the second step 19 leads further downward from the third step 20 while being gradually directed from the outer side toward the inner side. Thus, a length from the upper end of the third step 20 to the turnaround area 19D can be shortened, so that it is possible to reduce the inclination of the third step 20 while suppressing the forward projection of the third step 20. Additionally, since the second step 19 leads down from the outer side toward the inner side, even when the inclination of the second step 19 is sufficiently reduced, the second step 19 is prevented from projecting forward. Thus, while each of the second and third steps 19 and 20 can have a reduced inclination to be easier to ascend and descend, small approach angle and turning radius can be maintained.

The second step 19 includes the third inclined portion 19C having a lower surface that is remoter from the ground at a further outer position, so that the bumper 16 or the second step 19 is unlikely to be damaged during rolling or turning as described above. The first inclined portions 16B of the bumper 16 and the second inclined portion 19B of the second step 19 are inclined when seen in plan view, and thus also contribute to prevention of damage during rolling. Since the second step 19 includes the second inclined portion 19B when seen in plan view, a small turning radius can be maintained.

The fourth step 24 and the fifth step 25 are provided to the front side of the right access path 8. However, without using the fourth step 24 with a steep inclination, it is possible to ascend and descend between the ground and the right access path 8 via the first step 18, the third step 20 and the center access path 12 to safely ascend and descend between the ground and the right access path 8.

Although the best arrangement, method, and the like for carrying out the invention have been described above, the scope of the invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or any object of the invention.

Accordingly, any descriptions of shape or quantity or the like disclosed above are given as examples to enable easy understanding of the invention, and do not limit the present invention, so that descriptions using names of components, with any such limitations of shape or quantity or the like removed in part or whole, are included in the invention.

Although the front surface 16A of the bumper 16 is provided with the first step 18 only near the left end thereof to provide access between the ground the front access path 17 in the exemplary embodiment, another first step 18 may also be provided near the right end of the front surface 16A.

Although the second step 19 is provided to the upper portion of the left end of the bumper 16 and leads up from the bumper 16 while being directed outward on the left side thereof, the second step 19 may be provided to an upper portion of the right end of the bumper 16. Although the third step 20 leads up from the second step 19 on the left side of the hood 10, the third step 20 may lead up on the right side of the hood 10. In other words, a pair of step arrangements according to the invention may be provided to the front portion of the vehicle body 4 on the right and left sides thereof with a distance therebetween substantially in a bilaterally symmetrical manner. For this arrangement, instead of the fourth step 24 described in the exemplary embodiment, the second step 19 and the third step 20 are used in the same manner as on the right side.

With this arrangement, the upper portion of the bumper 16 provides the front access path 17 with a large width that enables access to the ground, so that it is possible to easily ascend from and descend to the ground using either one of the pair of first steps 18. With the second steps 19 provided to both ends of the front access path 17, it is possible to reach the access paths 7, 8 and 12 located at the upper side through, for instance, not only the left side of the hood 10 but also the right side thereof, resulting in easier access to each portion.

An upper portion of the step arrangement on the left side is connected to the left access path 7 and a lower portion thereof is connected to the bumper 16 near the left end of the bumper 16. An upper portion of the step arrangement on the right side is connected to the right access path 8 and a lower portion thereof is connected to the bumper 16 near the right end of the bumper 16. With this arrangement, it is possible to walk around the front grill 27 located between the step arrangements on the right and left sides. Specifically, for instance, it is possible to descend the step arrangement on the left side from the left access path 7 and ascend the step arrangement on the right side to reach the right access path 8 after passing in front of the front grill 27. Thus, after work around the hood 10 is done using the right and left access paths 7 and 8, maintenance around the front grill 27 can be continuously carried out on the step arrangements and the bumper 16 without descending to the ground.

Although the third inclined portion 19C is provided to the lower portion of the second step 19 to increase an approach angle in the exemplary embodiment, the arrangement gradually distanced from the ground such as the third inclined portion 19C is only exemplary, and the second step 19 may alternatively have a step-like lower portion to be remote upward from the ground by a predetermined distance at a position outside the bumper 16.

The invention claimed is:

1. A dump truck comprising a step arrangement for vertically ascending and vertically descending provided to a front portion of a vehicle body thereof, the step arrangement comprising:
   an upper step that extends vertically downward as it extends away from a front upper portion of the vehicle body; and
   a lower step that is connected to a lower end of the upper step and that extends vertically downward as it progresses toward a longitudinal centerline of the vehicle body, wherein
   a lowermost portion of an outer side of the lower step is positioned vertically higher than a lowermost portion of an inner side of the lower step, the outer side being positioned farther away from the longitudinal centerline of the vehicle body than the inner side.

2. The dump truck according to claim 1, wherein
   the step arrangement comprises a pair of step arrangements being respectively provided at right and left sides of the vehicle body with a distance therebetween.

3. The dump truck according to claim 1, wherein
   an outer corner of the lower step is provided with a step inclined portion that extends away from the front upper portion of the vehicle body while being directed toward the longitudinal centerline of the vehicle body.

4. The dump truck according to claim 3, wherein
   a rear wheel provided to the vehicle body comprises double tires,
   the lower step includes a front surface; and
   a boundary between the front surface of the lower step and the step inclined portion is located within a width of an inner one of the double tires.

5. The dump truck according to claim 3, wherein
   the lower step includes a front surface; and
   the front surface of the lower step and the step inclined portion are provided by a cover plate that extends vertically upward and outward relative to the longitudinal centerline of the vehicle body.

6. The dump truck according to claim 1, wherein
   an inner end of the lower step is located outside relative to a center of the vehicle body in a right-and-left direction of the vehicle body.

7. The dump truck according to claim 1, wherein
   a lower end of the lower step is connected to a bumper of the vehicle body, and
   an upper portion of the bumper provides a path that has a front-and-rear width to be walkable in the right-and-left direction of the vehicle body.

8. The dump truck according to claim 7, wherein
   each of right and left sides of the bumper is provided with a bumper inclined portion that extends away from the front upper portion of the vehicle body while being directed inward toward the longitudinal centerline.

9. The dump truck according to claim 7, wherein
   the step arrangement includes a pair of step arrangements being respectively provided at right and left sides of the vehicle body with a distance therebetween,
   lower portions of the pair of step arrangements are connected to the bumper,
   upper portions of the pair of step arrangements are connected to access paths provided at upper right and left of the vehicle body, respectively, and
   a front grill through which a cooling air passes is located on the vehicle body at a position between the pair of step arrangements.

10. The dump truck according to claim 1, wherein
    the lower step is oriented orthogonal to the upper step.

11. A dump truck comprising a step arrangement for vertically ascending and vertically descending provided to a front portion of a vehicle body thereof, the step arrangement comprising:
    an upper step that extends vertically downward as it extends away from a front upper portion of the vehicle body; and
    a lower step that is connected to a lower end of the upper step and that extends vertically downward as it progresses toward a longitudinal centerline of the vehicle body, wherein
    a lowermost portion of an outer side of the lower step is positioned vertically higher than a lowermost portion of an inner side of the lower step, the outer side being positioned farther away from the longitudinal centerline of the vehicle body than the inner side, and
    an outer corner of the lower step is provided with a step inclined portion that extends away from the front upper portion of the vehicle body while being directed toward the longitudinal centerline of the vehicle body.

12. The dump truck according to claim 11, wherein
    a rear wheel provided to the vehicle body comprises double tires,
    the lower step includes a front surface; and
    a boundary between the front surface of the lower step and the step inclined portion is located within a width of an inner one of the double tires.

13. The dump truck according to claim 11, wherein
    the lower step includes a front surface; and
    the front surface of the lower step and the step inclined portion are provided by a cover plate that extends vertically upward and outward relative to the longitudinal centerline of the vehicle body.

14. The dump truck according to claim 11, wherein
    the lower step is oriented orthogonal to the upper step.

15. A dump truck comprising a step arrangement for vertically ascending and vertically descending provided to a front portion of a vehicle body thereof, the step arrangement comprising:
- an upper step that extends vertically downward as it extends away from a front upper portion of the vehicle body; and
- a lower step that is connected to a lower end of the upper step and that extends vertically downward as it progresses toward a longitudinal centerline of the vehicle body, wherein
- a lowermost portion of an outer side of the lower step is positioned vertically higher than a lowermost portion of an inner side of the lower step, the outer side being positioned farther away from the longitudinal centerline of the vehicle body than the inner side,
- a lower end of the lower step is connected to a bumper of the vehicle body, and
- an upper portion of the bumper provides a path that has a front-and-rear width to be walkable in the right-and-left direction of the vehicle body.

16. The dump truck according to claim 15, wherein
each of right and left sides of the bumper is provided with
- a bumper inclined portion that extends away from the front upper portion of the vehicle body while being directed inward toward the longitudinal centerline.

17. The dump truck according to claim 15, wherein
- the step arrangement includes a pair of step arrangements being respectively provided at right and left sides of the vehicle body with a distance therebetween,
- lower portions of the pair of step arrangements are connected to the bumper,
- upper portions of the pair of step arrangements are connected to access paths provided at upper right and left of the vehicle body, respectively, and
- a front grill through which a cooling air passes is located on the vehicle body at a position between the pair of step arrangements.

18. The dump truck according to claim 15, wherein
the lower step is oriented orthogonal to the upper step.

* * * * *